July 27, 1971  R. C. FARRAR ET AL  3,595,941
METHOD FOR CONTROLLING THE MONEY VISCOSITY
OF ALKALI METAL-TERMINATED POLYMERS
Filed Nov. 4, 1966

INVENTORS
R.C. FARRAR
A.C. ROTHLISBERGER
BY
Young & Quigg
ATTORNEYS

United States Patent Office 3,595,941
Patented July 27, 1971

3,595,941
METHOD FOR CONTROLLING THE MOONEY VISCOSITY OF ALKALI METAL-TERMINATED POLYMERS
Ralph C. Farrar and Alvin C. Rothlisberger, Bartlesville, Okla., assignors to Phillips Petroleum Company
Filed Nov. 4, 1966, Ser. No. 592,000
Int. Cl. C08d 5/02; C08f 15/04, 27/00
U.S. Cl. 260—879                                    12 Claims

ABSTRACT OF THE DISCLOSURE

In the formation of random or block copolymers of a conjugated diene and styrene, a yellow color forms only when polymerization of the conjugated diene is substantially complete. The color formation is utilized to determine the optimum time for addition of treating agents to provide coupling and/or branching, so as to substantially increase the Mooney value of the final polymer.

---

Figure 2:
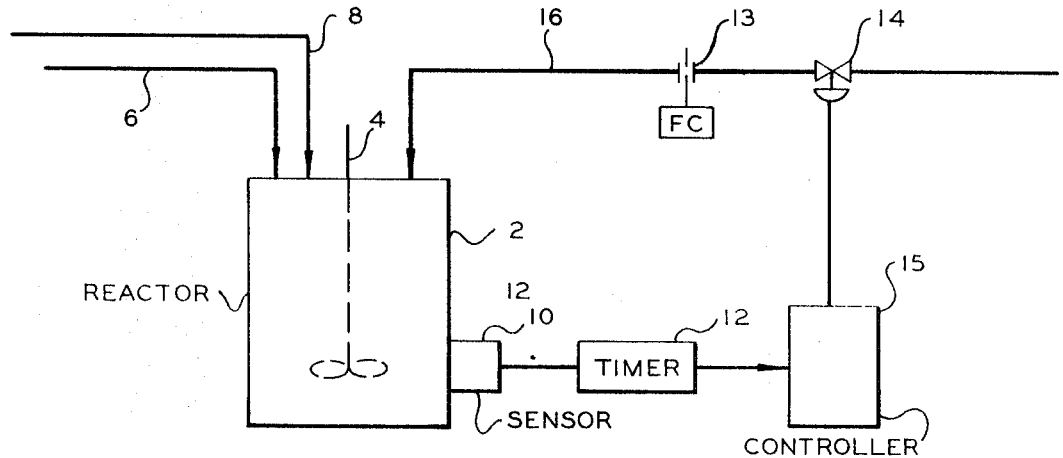

This invention relates to alkali metal-terminated polymers. In one of its aspects it relates to a method for controlling the Mooney viscosity of alkali metal-terminated polymers containing a conjugated diene and a vinyl aromatic compound by detecting the appearance of a color indicative of the substantial completion of the polymerization of the conjugated diene and adding a coupling agent to the polymerization mixture after a predetermined interval of time sufficient to give the desired Mooney value for the coupled polymer.

In another of its aspects the invention relates to a method for obtaining the maximum effect for treating an alkali metal-terminated polymer of a conjugated diene in which is present in the polymerization mixture a vinyl-substituted aromatic compound, comprising detecting a color in the polymerization solution and adding a treating agent within a short period of time after the color is detected.

Many useful polymers can be made by polymerizing conjugated dienes and/or vinyl-substituted aromatic compounds with organolithium initiators. The versatility of these products is increased by the ability of the polymerizate to undergo coupling or branching reactions with polyfunctional organic compounds. Because of the nature of the polymerization mechanism, the polymers formed by these organolithium-initiated reactions contain lithium atoms on at least one end of the polymer molecule. It is known that these lithium-terminated polymers can be treated with reagents of various types to increase the molecular weight of the polymer by coupling reactions involving functional groups of the treating agent and the lithium atoms in the polymer. Reactions of this type are described in U.S. Pat. 3,135,716 of Uraneck, Short and Zelinski and U.S. Pat. 3,078,254 of Zelinski and Hsieh. As disclosed in this latter patent, the use of coupling reagents having three or more functional groups in reaction with polymers formed from organomonolithium initiators produces a branched or radial polymer. These polymers have very interesting properties and a particularly valuable application of this principle lies in treating rubbery polymerizates in order to reduce the tendency of the final product to cold flow in the unvulcanized state.

Whether it is desired to couple lithium-terminated polymers by reaction with difunctional treating agents or to obtain branched polymers with agents having three or more functional groups, the amount of functional treating agent must be correlated very closely to the functionality of the polymer in order to obtain the maximum effect desired. It has been described in the above-mentioned patent of Uraneck et al., that treating agents which react with the terminal lithium atoms in the polymer can either introduce functional groups into the polymer in place of the lithium atoms or couple the polymer molecules, depending upon the amount of treating agent used. This, of course, applies only to reagents which exhibit a multiple functionality in their reactions with the lithium-terminated polymer. Maximum coupling or branching is obtained by maintaining an exact stoichiometric relationship between the active lithium atoms in the polymer and the functional groups in the coupling agent. If less than a stoichiometric quantity is used, some of the polymer molecules remain unreacted and unaffected by the treatment. If more than a stoichiometric amount is used, the polymers are simply terminated with functional groups rather than coupled or, in the case of coupling agents having 3 or more functional groups, the polymers may be coupled rather than branched or cross-linked.

In copending application Ser. No. 377,107, filed June 22, 1964, there is disclosed and claimed a method for providing a stoichiometric quantity of treating agent to react with lithium-terminated polymers by using as a titrating indicator a solution coloring developed by the addition of an ether, thioether or tertiary amine containing compound to the polymerization solution.

It has been found that maximum coupling depends not only upon stoichiometric quantities of treating agents but also the time of addition of the treating agent after the polymerization is substantially complete. Lithium-terminated bonds become deactivated with increasing time after the completion of polymerization. This deactivation becomes more acute with the presence of extraneous materials such as allene, 1,2-butadiene, 1-butyne, vinylacetylene, and carbonyl compounds. These materials are oftentimes present in refinery streams containing conjugated diene monomers whose use is desired for polymerization.

It would be desirable to remove the extraneous materials from the refinery streams to obtain laboratory grade polymerizable compounds. Unfortunately, considerable expense is involved in the production of laboratory grade polymerizable compounds and this adds to the cost of the polymer. It is thus desirable to produce a suitable polymer with a low grade refinery stream.

I have now discovered that a color appears in the polymerization solution when a vinyl aromatic compound is present at the time that the polymerization of conjugated dienes is substantially complete. The appearance of the color is thus used in determining the time at which to add the treating agent to obtain the desired properties of the resulting polymer.

By various aspects of this invention, one or more of the following, or other, objects can be obtained.

It is an object of this invention to provide a process for the production of polymers with a maximum Mooney viscosity increase after addition of a polyfunctional treating agent to a polymerization reaction mixture.

It is a further object of this invention to provide a process for controlling the Mooney viscosity of a polymer of a conjugated diene.

It is a further object of this invention to provide a process for producing a block or random conjugated diene/vinyl aromatic copolymer with a predetermined Mooney viscosity.

It is a still further object of this invention to provide a process for producing a polymer of a conjugated diene with a desired Mooney value in which process a low quality feedstock is employed.

Other aspects, objects, and the several advantages of this invention are apparent to one skilled in the art from a study of this disclosure, the drawings and the appended claims.

According to the invention, the coupling effect given to a polymer of a conjugated diene containing terminal lithium-carbon atom bonds when reacted with a polyfunctional treating agent in the presence of a vinyl aromatic compound is controlled by detecting a color appearing in the polymerization solution, the color being representative of the depletion of the conjugated diene monomer, adding to the polymerization solution the treating agent thereafter at such time as desired to obtain the desired property changes for the polymer.

In one embodiment, a polyfunctional treating agent is added to couple the polymer and give a desired Mooney viscosity to the resulting polymer.

It has been found that vinyl aromatic-lithium compounds give rise to a coloring in the absence of monomeric conjugated dienes. In the case of styrene, a yellow to orange-red coloring results depending upon the concentration of the styrene. These colors can be intensified and/or altered by addition of ether, thioether or tertiary amine compounds to the polymerization solution. Generally, the color will range from a light yellow to a dark orange or red.

The polymerization systems to which our invention applies are well known. The monomers which are polymerized are conjugated dienes and vinyl-substituted aromatic compounds. Conjugated dienes containing from 4 to 12 carbon atoms per molecule such as 1,3-butadiene, isoprene, piperylene, 2-phenyl-1,3-butadiene, 4,5-diethyl-1,3-octadiene, and the like can be employed. Vinyl-substituted aromatic compounds include styrene, 1-vinylnaphthalene, 2-vinylnaphthalene, and the like. One or more of the conjugated dienes can be copolymerized with one or more vinyl-substituted aromatic compounds to form either block or random copolymers. The formation of random copolymers of this type is described in U.S. Pat. 2,975,160 of Zelinski.

The polymerization initiators which are used in the polymerization systems are preferably organolithium compounds. These initiators can be either mono- or polyfunctional. Ordinarily the initiators are hydrocarbon except for the lithium atoms but functional groups which are inert with respect to the polymerization reaction can be present in the compound. The essential feature of these initiators is that they possess a carbon-lithium bond which acts as the point of initiation for the polymerization. The growth of the polymer is also propagated through the carbon-lithium bond which becomes a part of the polymer. Most commonly the initiators employed can be represented by the formula $RLi_x$ wherein $x$ is an integer of 1 to 4 and R is a hydrocarbon radical, either aliphatic, cycloaliphatic or aromatic, or combinations thereof, and containing up to about 30 carbon atoms per molecule. Examples of suitable initiators are n-butyllithium, n-amyllithium, 1,4-dilithiobutane, dilithionaphthalene, dilithium adducts of dimers, trimers and tetramers of conjugated dienes such as 1,3-butadiene and isoprene, and the like.

The polymerizations are carried out in a hydrocarbon reaction medium. A liquid hydrocarbon diluent such as n-pentane, n-hexane, isooctane, cyclohexane, toluene, benzene, xylene and the like is suitable. The concentration of the initiator can be regulated to control molecular weight. Generally, the initiator concentration is in the range of about 0.25 to 50 millimoles per 100 grams of monomer although both higher and lower initiator levels can be used if desired. The required initiator level frequently depends upon the solubility of the initiator in the hydrocarbon diluent. These polymerization reactions are usually carried out at a temperature in the range of —60 to +300° F. and at pressures which are sufficient to maintain the reaction mixture in the liquid phase.

The treating agents useful in the invention are preferably those polyfunctional agents which contain at least two reactive sites capable of reacting with the carbon-lithium bonds in the polymer. These treating agents produce polymer branching and/or coupling. Examples of types of compounds which can be used include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups, isocyanate and halide groups, and the like. Various other substituents which are inert in the treating reaction can be present such as hydrocarbon radicals as exemplified by the alkyls, cycloalkyl, aryl, aralkyl and alkaryl groups and the alkoxy, aryloxy, alkylthio, arylthio, and tertiary amino groups. Many suitable types of these polyfunctional compounds have been described in the above-mentioned patents of Uraneck et al. and Zelinski et al. Polyhalides such as methylene chloride, 1,4-dichlorobutane, silicon tetrahalides, di- and trihalosilanes, and other polyhalides as described by Zelinski et al. are suitable. Compounds named in this patent which contain an ether linkage can also be used both for coupling and for producing titrating color in the polymer solution. The polyimines, as exemplified by the triaziridinyl triazines described in U.S. Pat. 3,097,193, and the aziridinyl phosphine oxides and sulfides described in U.S. Pat. 3,074,917, can be used. Illustrative of other specific treating agents which can be employed are the following:

1,2:5,6-diepoxyhexane,
1,2:5,6:9,10-triepoxydecane,
1,2:10,11-diepoxy-4,8-dioxaundecane,
epoxidized liquid polybutadiene,
epoxy resins containing ether linkages such as the Kopox epoxy resins marketed by Koppers Company, Inc.,
benzene-1,4-diisocyanate,
benzene-1,2,4-triisocyanate,
2-(N,N-dimethylamino)benzene-1,4-diisocyanate,
3,5-(di-n-butylthio)benzene-1,4-diisocyanate,
2,7-naphthalenedicarboxaldehyde,
3,6-dimethoxy-2,7-naphthalenedicarboxaldehyde,
1,1,5-pentanetricarboxaldehyde,
1,3,6-hexanetrione,
pyromellitic dianhydride,
styrene-maleic anhydride copolymer,
glycerol tristearates,
glycerol trioleates,
1,3,5-tri(bromomethyl)benzene,
1,3-dichloro-2-propanone,
1,2:4,5-diepoxy-3-pentanone,
1,2:6,7-diepoxy-8-thia-4-heptanone, and the like.

The maximum amount of coupling is obtained by adding the treating agent as soon as the conjugated diene monomer is depleted and in an exact stoichiometric relationship between the active lithium atoms in the polymer and the functional groups in the treating agents. A convenient method for determining the amount of treating agent is to add a small amount initially, i.e., at the time when the number of carbon lithium bonds in the polymer has reached a maximum level and the remainder continuously or in small increments with agitation being continued throughout the reaction period. The reaction normally ocurs as soon as the materials are blended so that the time for treatment is quite short. As soon as the stoichiometric quantity of coupling agent has been introduced, the color in the reaction mixture disappears. As hereinbefore mentioned, the color resulting from the vinyl aromatic-lithium compounds can be intensified or supplemented by the addition of a compound containing an ether, thioether or tertiary amine linkage.

EXAMPLE I

A series of runs was made for the random copolymerization of butadiene with styrene. Run No. 1, which was reserved as a control run, was terminated with isopropyl alcohol. Stannic chloride was added as a terminating agent in each of the other runs. The time of addition of the stannic chloride after a yellow color developed in the polymerization mixture was varied in order to determine at what point maximum coupling, or branching, ocurred. The polymerization recipe was as follows:

| | |
|---|---:|
| 1,3-butadiene, parts by weight | 75 |
| Styrene | 25 |
| Butanes and butenes [1], parts by weight | 112.5 |
| Cyclohexane, parts by weight | 760 |
| Tetrahydrofuran, parts by weight | 1.5 |
| n-Butyllithium, mhm.[2] | 1.15 |

[1] The butadiene employed was a mixture that contained butanes and butenes in the following proportions:

| | Wt. percent |
|---|---:|
| 1,3-butadiene | 40.0 |
| 1-butene | 15.4 |
| Cis-2-butene | 5.9 |
| Trans-2-butene | 4.0 |
| Isobutene | 28.8 |
| n-Butane | 5.8 |
| Isobutane | 0.1 |

[2] Gram millimoles per 100 grams of monomers.

In each run the diluent was charged to the reactor which was then purged with nitrogen. Butadiene was added followed by the styrene, then the tetrahydrofuran and finally the butyllithium. These materials were charged at room temperature. The mixture was then heated to 158° F. The polymerization mixture was colorless at first but developed a yellow color just before quantitative monomer conversion was reached. As soon as the yellow color developed in the control run (No. 1), it was terminated by the addition of an antioxidant solution [approximately one weight percent based on the polymer of 2,2'-methylene-bis(4-methyl-6-tert-butylphenol) dissolved in a mixture of equal volumes of isopropyl alcohol and toluene]. The polymer was coagulated in isopropyl alcohol, separated, and dried. In the other runs 0.20 mhm. of stannic chloride was added as a terminating agent (approximately 0.1 molar solution of $SnCl_4$ in cyclohexane), the mixture was heated for 30 minutes at 158° F. to complete the reaction, and an antioxidant solution was added as in the control run. The polymer was then coagulated in isopropyl alcohol, separated, and dried. The following results were obtained:

| Run No. | Poly. time, mins. | Time to develop color, mins. | Time of addition of $SnCl_4$, mins.[1] | Conv., percent | ML–4 at 212° F.[2] | Δ ML–4 over control |
|---|---|---|---|---|---|---|
| 1 | 17 | 17 | —(control)[3] | 93.9 | 11 | |
| 2 | 18 | 18 | 0 | 94.2 | 79 | 68 |
| 3 | 21 | 18 | 3 | 95.5 | 76 | 65 |
| 4 | 26 | 18 | 8 | 95.9 | 66 | 55 |
| 5 | 33 | 18 | 15 | 95.9 | 58 | 47 |
| 6 | 43 | 19 | 24 | 96.6 | 51 | 40 |

[1] Time after polymerization mixture turned yellow.
[2] ASTM D 1646–63.
[3] Reaction terminated when yellow color appeared.

While all runs showed a substantial Mooney increase over the control, the data show that best results were obtained when the stannic chloride was added within three minutes after the yellow color developed in the polymerization mixture. The highest Mooney values are indicative of the highest percentage of active polymer-lithium (carbon-lithium bonds) present. It appears that heat aging destroyed some of the carbon-lithium bonds thereby decreasing the amount of coupling that could be obtained. This effect is evidence by the decrease in Mooney with an increase in total polymerization time. The last column of data shows the increase in Mooney over the control polymer as a result of stannic chloride termination.

EXAMPLE II

The recipe of Example I was employed for the random copolymerization of butadiene with styrene except that the n-butyllithium initiator level was 1.30 mhm. and the following compounds were present in the butadiene:

| | Parts per million parts 1,3-butadiene |
|---|---:|
| Allene | 25 |
| 1,2-butadiene | 300 |
| 1-butyne | 61.5 |
| Vinylacetylene | 12.5 |
| Acetaldehyde | [1] 55 |

[1] Includes 22.5 parts per million parts 1,3-butadiene present in the butadiene mixture described in Example I.

The procedure was the same as that of the preceding example. A control run was terminated with isopropyl alcohol. The amount of stannic chloride used in each of the other runs was 0.20 mhm. Results were as follows:

| Run No. | Poly. time, mins. | Time to develop color, mins. | Time of addition of $SnCl_4$, mins.[1] | Conv., percent | ML–4 at 212° F.[2] | Δ ML–4 over control |
|---|---|---|---|---|---|---|
| 7 | 30 | 26 | 4 (control)[3] | 95.6 | 29 | |
| 8 | 26 | 26 | 0 | 94.1 | 66 | 37 |
| 9 | 30 | 26 | 4 | 96.7 | 57.6 | 28.6 |
| 10 | 35 | 26 | 9 | 96.7 | 53.5 | 24.5 |
| 11 | 42 | 26 | 16 | 96.8 | 47.5 | 18.5 |

[1] Time after polymerization mixture turned yellow.
[2] ASTM D 1646–63.
[3] Polymerization was continued four minutes after yellow color developed.

These data show that in this system it was necessary to add the terminating agent as soon as the yellow color developed or very shortly thereafter in order to get a suitable increased in Mooney. The increase in Mooney over the control was not so pronounced as in Example I. A substantial drop in Mooney occurred during the four minute interval after the color appeared and this trend continued as the time before termination of the reaction was increased. The presence of the acetaldehyde, allene, 1,2-butadiene and acetylenes in the butadiene in these runs accounted for a slower polymerization rate than was obtained in Example I, and even though the initiator level was higher, the Mooney of the control polymer was higher than that of the preceding example.

EXAMPLE III

Laboratory grade butadiene was employed in a series of runs for the copolymerization of butadiene with styrene in the presence of n-butyllithium as the initiator. The following polymerization recipe was used:

| | |
|---|---:|
| 1,3-butadiene, parts by weight | 75 |
| Styrene, parts by weight | 25 |
| Cyclohexane, parts by weight | 780 |
| Tetrahydrofuran, parts by weight | 1.5 |
| n-butyllithium, mhm. | 1.1 |
| Temperature, ° F. | 158 |
| Time, minutes | Variable |

A series of runs was made and terminated at different times with 0.2 mhm. of stannic chloride. Conversion was above 98 percent in all runs. Mooney values were determined on the base polymers terminated with an isopropyl alcohol-toluene solution of antioxidant, as for control polymers in the preceding examples, and on the polymers terminated with stannic chloride. Results were as follows:

| | | ML–4 at 212° F.[1] | | |
|---|---|---|---|---|
| Run No. | Polymerization time, mins. | Base polymer | $SnCl_4$ terminated | Δ ML–4 |
| 12 | 20 | 13 | 87 | 74 |
| 13 | 30 | 13 | 83 | 70 |
| 14 | 45 | 14 | 73 | 59 |
| 15 | 60 | 16 | 72 | 56 |

[1] ASTM D 1646–63.

These data show that when operating with laboratory grade butadiene, a very significant Mooney increase was obtained even after 60 minutes polymerization time. The rate of inactivation of polymer-lithium was not nearly so great as it was when various types of extraneous materials were present, as in Examples I and II. Polymerization was essentially quantitative after twenty minutes.

EXAMPLE IV

Polymerization runs were carried out using the following recipe:

| Run No. | 16 | 17 | 18 |
|---|---|---|---|
| 1,3-butadiene, parts by weight | 100 | 75 | 0 |
| Styrene, parts by weight | 0 | 25 | 25 |
| Cyclohexane, parts by weight | 760 | 760 | 760 |
| n-Butyllithium, mhm | 1.4 | 1.4 | ¹1.4 |

¹ Based on 25 grams styrene instead of 100 grams total monomers.

NOTE.—Mhm.=gram millimoles per 100 grams monomers.

In each run cyclohexane was charged first, the reactor was purged with nitrogen, butadiene was added (when used), then the styrene (when used), and finally the butyllithium. The temperature was adjusted to 158° F. (70° C.) and maintained at this level for two hours. At the close of this period each reaction was terminated with a 50/50 volume mixture of isopropyl alcohol and toluene containing 0.1 gram per ml. of solution of 2,2'-methylene-bis(4-methyl-6-tert-butylphenyl). The color of each reaction mixture was observed at various intervals. Results were as follows:

| Time minutes: | Color 1 | Color 2 | Color 3 |
|---|---|---|---|
| 6 | Colorless | Colorless | Bright yellow. |
| 10 | do | do | Do. |
| 19 | do | do | Do. |
| 32 | do | do | Do. |
| 45 | do | Very light yellow. | Do. |
| 46 | do | Bright yellow. | Do. |
| 60 | do | do | Do. |
| 120 | Very slight yellowish tint detected. | do | Do. |
| Terminated at 120 minutes. | Colorless | Colorless | Colorless. |

The above runs show that the formation of styrene-lithium bonds in a polymerization mixture cause the mixture to develop a yellow color. The runs also show that the styrene-lithium formation and thus the color does not occur until the butadiene present is depleted.

Figure 1:
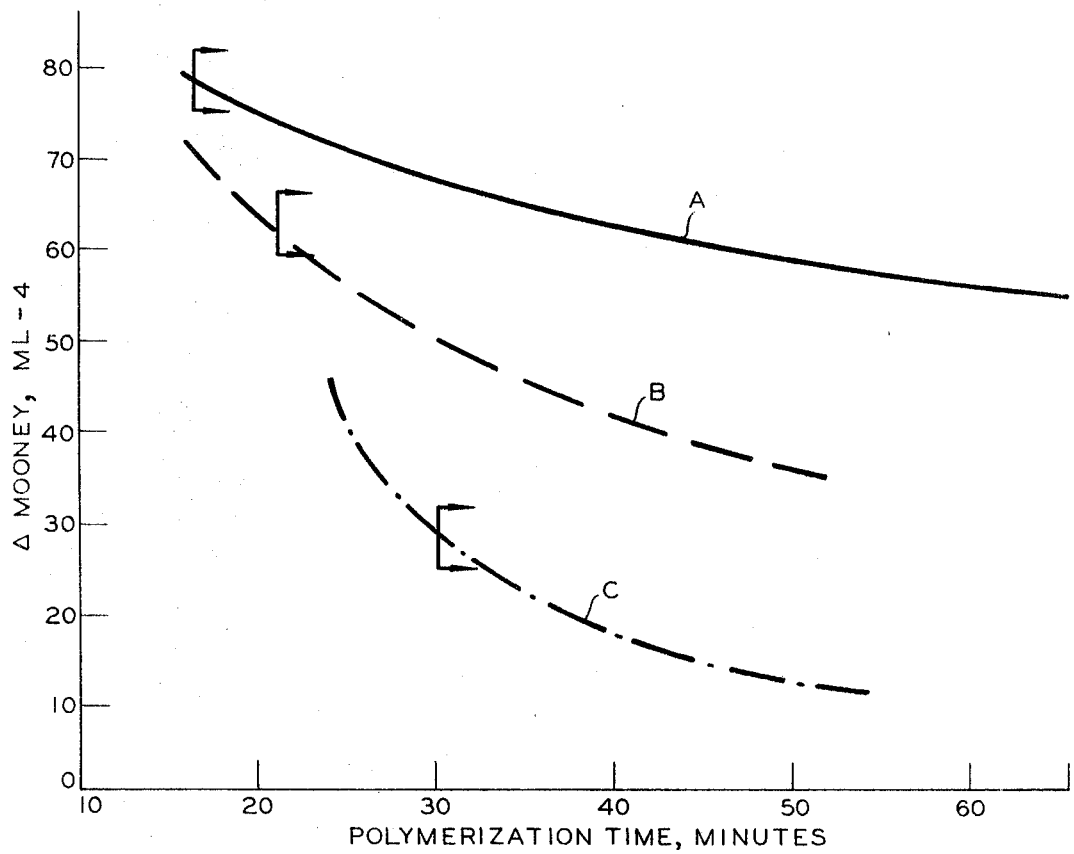

The effect of polymerization time on conversion of various grades of butadiene feedstock is shown in FIG. 1. Curve A represents a curve obtained using laboratory grade butadiene. Curve B shows results obtained using the feedstock of Example I, and curve C shows the results using the feedstock of Example II. Quantitative conversion is shown to the right of the arrows on each of the curves.

The slopes of the curves of FIG. 1 show different responses to aging before coupling. The laboratory grade butadiene was much less sensitive to aging (continuation of polymerization after quantitative conversion was reached). The rate of inactivation of polymer-lithium was slower for laboratory grade butadiene than when other materials were present in the feedstock. Thus it can be seen from FIG. 1 that a desired increase in Mooney can be obtained for a given polymer produced from a given feedstock by selecting the time at which the polyfunctional treating agent is added.

The invention will now be further exemplified by reference to FIG. 2 which shows an embodiment of the invention.

Referring now to FIG. 2, a feedstock containing for example butadiene, styrene and solvent enters polymerization reaction chamber 2 through line 6. Catalyst is added to the reaction chamber 2 through line 8. Reaction chamber 2 contains stirrer 4 and is provided with a photometric sensing device 10 which is adapted to sense the color of the polymerization mixture. A suitable photometric sensor is described in S.N. 261,450 filed Feb. 27, 1963, now Pat. No. 3,290,116.

Photometric sensor 10 is connected to timer 12. The signal from timer 12 is sent to on-off controller 15 which in turn is adapted to actuate valve 14 in line 16 which supplies the polyfunctional treating agent. A flow controller 13 is positioned in line 16 to control the rate at which the treating agent is added to the reactor. Any on-off controller can be used.

In operation, butadiene and styrene are charged through line 6 and catalyst is charged through line 8 to chamber 2. When the polymerization is substantially complete and the yellow color forms in the solution, photometric detector 10 senses the yellow coloring and actuates timer 12 responsive thereto. Timer 12 can be set for a predetermined time at the end of which a signal is sent to on-off controller 15 which opens valve 14 to meter into chamber 2 a polyfunctional treating agent through line 16 to give a polymer having a predetermined Mooney value. The polyfunctional treating agent is metered into chamber 2 until the yellow color of the solution disappears. The absence of color is sensed by detector 10 which in turn signals on-off controller 15 through timer 12 to close valve 14, thereby cutting off the supply of treating agent to chamber 2. If desired, timer 12 can be bypassed and the treating agent is added as soon as the yellow color appears.

The invention is preferably used in the formation of random copolymers of butadiene and styrene. The yellow color in the solution will appear after all of the butadiene has been polymerized and the styrene-lithium bonds are thereby formed.

The invention can also be used to produce block copolymers. In this instance, butadiene and styrene are charged to a reactor without a randomizing agent. Butadiene and a minor amount of the styrene will copolymerize first in block form. When the butadiene is depleted, a yellow color will appear in the solution and styrene will begin to polymerize onto the polybutadiene block. The polyfunctional treating agent can then be added to the solution as soon as enough time has been elapsed to allow the styrene to finish polymerizing on the polybutadiene block. This time can be calculated or calibrated according to the styrene content in the feed.

Another method of forming a block styrene butadiene copolymer is to first polymerize the styrene in the absence of butadiene and then add butadiene to the polymerization reaction mixture while there is still a small amount of unreacted styrene. When the butadiene is added a yellow color, which develops during the styrene polymerization, will be extinguished, but will reappear when the butadiene is depleted. The reappearance of the yellow color indicates the completion of the block copolymerization. The treating agent can then be added as desired.

The invention can also be used in terminating homopolymers of conjugated diolefins. In this embodiment, a small amount of vinyl aromatic compound is added to the polymerization solution. The amount of vinyl aromatic compound will be sufficient to give a coloring to the solution but insufficient to give any substantial copolymerization products. In this embodiment, the yellow coloring will form as soon as the butadiene has been substantially completely polymerized.

Reasonable variation and modification are possible within the scope of the foregoing disclosure, the drawings, and claims to the invention without departing from the spirit thereof.

We claim:
1. A process to substantially affect the Mooney value of a polymer, which comprises:
   (a) polymerizing under polymerization conditions a polymerizable conjugated diene in the presence of (1) an organolithium initiator and (2) a vinyl substituted aromatic compound, whereby a polymer containing a terminal lithium carbon atom bond is formed, said polymer containing a terminal lithium carbon atom bond forming a color in the presence of said vinyl substituted aromatic compound in the substantial absence of said polymerizable conjugated diene, said color being extinguished by coupling of said polymer with at least one polyfunctional treating agent, (b) producing a signal representative of the said color, said signal continuing as long as said color is present, (c) feeding said at least one polyfunctional treating agent in response to said signal, said feeding continuing as long as said signal is continuing and whereby coupling said polymer with said polyfunctional treating agent, and thereby substantially affecting the Mooney value of said polymer.

2. A process according to claim 1 wherein the said feeding in step (c) in response to said signal is delayed from 30 seconds to 60 minutes and thereby the said Mooney value is fixed at a predetermined value less than the maximum Mooney value obtainable in coupling said polymer.

3. A process according to claim 1 wherein the said polymer is a random copolymer of the said polymerizable conjugated diene and said vinyl substituted aromatic compound.

4. The process according to claim 1 wherein the said polymerizable conjugated diene contains from 4 to about 12 carbon atoms per molecule, and wherein the said vinyl substituted aromatic compound contains from 8 to about 12 carbon atoms.

5. The process according to claim 1 wherein the said polyfunctional treating agent has at least two functional groups and is selected from the group consisting of polyepoxides, polyisocyanates, polyimines, polyaldehydes, polyketones, polyanhydrides, polyesters, polyhalides, polyketones, agents having a plurality of types of said functional groups, and mixtures thereof.

6. The process according to claim 1 wherein the said color is intensified by the further addition of a minor amount of at least one material selected from the group ethers, thioethers, and tertiary amines, to the polymerization solution.

7. A process according to claim 1 wherein said polymer is a block copolymer of butadiene and styrene in which butadiene is first polymerized and the time for adding said treating agent is selected to allow styrene to polymerize onto the butadiene block polymer.

8. A process according to claim 1 wherein said polymer is a block butadiene-styrene copolymer in which styrene is first polymerized and then butadiene is added to the polymerization zone.

9. A process according to claim 2 wherein said polyfunctional treating agent is added within four minutes after said color is detected and wherein said polymer is a random copolymer of butadiene and styrene.

10. A process according to claim 2 wherein said treating agent is added within 3 hours after the color develops.

11. A process according to claim 2 wherein said treating agent is added within 60 minutes after the color appears.

12. A process according to claim 2 wherein said treating agent is added within four minutes after said color develops.

References Cited
UNITED STATES PATENTS

| | | | |
|---|---|---|---|
| 3,031,432 | 4/1962 | Kern | 260—880 |
| 3,078,254 | 2/1963 | Zelinski et al. | 260—880 |
| 3,135,716 | 6/1964 | Uraneck et al. | 260—880 |

JAMES A. SEIDLECK, Primary Examiner

U.S. Cl. X.R.

260—66, 77.5, 83.7, 85.1, 94.2, 94.7, 880